(12) United States Patent  (10) Patent No.: US 7,009,941 B1
Uchino  (45) Date of Patent: Mar. 7, 2006

(54) NODE-SEARCH METHOD, DEVICE, AND MEDIUM ON WHICH A NODE-SEARCH PROGRAM IS RECORDED

(75) Inventor: Atsushi Uchino, San Jose, CA (US)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/544,544

(22) Filed: Apr. 6, 2000

(30) Foreign Application Priority Data

Apr. 8, 1999  (JP) ................................. 11-101754
Feb. 14, 2000  (JP) ............................. 2000-035175

(51) Int. Cl.
    *H04L 12/28* (2006.01)
(52) U.S. Cl. ...................... 370/254; 370/400; 370/432
(58) Field of Classification Search ................ 370/254, 370/255, 256, 257, 258, 392, 401, 402, 403, 370/404, 405, 400, 432
See application file for complete search history.

(56) References Cited

U.S. PATENT DOCUMENTS

| | | | | |
|---|---|---|---|---|
| 4,827,411 A | * | 5/1989 | Arrowood et al. | 707/206 |
| 4,914,571 A | * | 4/1990 | Baratz et al. | 707/10 |
| 5,185,860 A | * | 2/1993 | Wu | 709/224 |
| 5,224,205 A | * | 6/1993 | Dinkin et al. | 709/226 |
| 5,511,208 A | * | 4/1996 | Boyles et al. | 709/223 |
| 5,687,320 A | * | 11/1997 | Wiley et al. | 709/245 |
| 5,726,985 A | * | 3/1998 | Daniel et al. | 370/382 |
| 5,754,790 A | * | 5/1998 | France et al. | 709/238 |
| 5,815,668 A | * | 9/1998 | Hashimoto | 709/238 |
| 5,852,744 A | * | 12/1998 | Agatone et al. | 710/17 |
| 5,909,433 A | * | 6/1999 | Haartsen | 370/337 |
| 5,926,463 A | * | 7/1999 | Ahearn et al. | 370/254 |
| 6,052,718 A | * | 4/2000 | Gifford | 709/219 |
| 6,084,859 A | * | 7/2000 | Ratcliff et al. | 370/252 |
| 6,097,718 A | * | 8/2000 | Bion | 370/351 |
| 6,401,124 B1 | * | 6/2002 | Yang et al. | 709/228 |
| 6,496,859 B1 | * | 12/2002 | Roy et al. | 709/223 |

FOREIGN PATENT DOCUMENTS

| | | |
|---|---|---|
| JP | 8-147231 | 6/1996 |
| JP | 11-032082 | 2/1999 |
| JP | 11-055308 | 2/1999 |
| JP | 11-068766 | 3/1999 |

* cited by examiner

*Primary Examiner*—Huy D. Vu
*Assistant Examiner*—Daniel Ryman
(74) *Attorney, Agent, or Firm*—Sughrue Mion, PLLC

(57) ABSTRACT

There are disclosed a method and device for searching equipment, such as a printer, connected to a network through a router by using a broadcast packet are disclosed. A host 110 acquires routing information from a router 200. The host 110 analyzes a domain name of a sub network B103 in the routing information so as to acquire a broadcast address in the domain, then, send a broadcast packet requesting a printer name addressed to the broadcast address through the router 200. The host 110 searches a printer 120 by receiving a response packet for the broadcast packet.

1 Claim, 12 Drawing Sheets

| DOMAIN NAME (NETWORK ADDRESS) 132d1 | DESTINATION ROUTER 132d2 | NETMASK 132d3 |
|---|---|---|
| xxx.yyy.1.0 | xxx.yyy.2.1 | 255.255.255.0 |
| xxx.yyy.2.0 | xxx.yyy.2.1 | 255.255.255.0 |
| xxx.yyy.3.0 | xxx.yyy.2.1 | 255.255.255.0 |
| xxx.yyy.4.0 | xxx.yyy.2.1 | 255.255.255.0 |
| xxx.yyy.11.0 | xxx.yyy.2.1 | 255.255.255.0 |
| ⋮ | ⋮ | ⋮ |

| DOMAIN NAME 132p1 | PRINTER NAME 132p2 | IP ADDRESS 132p3 |
|---|---|---|
| xxx.yyy.1.0 | DIAMOND | xxx.yyy.1.100 |
| xxx.yyy.2.0 | EMERALD | xxx.yyy.2.10 |
| xxx.yyy.2.0 | CRYSTAL | xxx.yyy.2.22 |
| xxx.yyy.3.0 | | |
| xxx.yyy.4.0 | | |
| xxx.yyy.11.0 | | |
| ⋮ | ⋮ | ⋮ |

NODE-SEARCH METHOD, DEVICE, AND MEDIUM ON WHICH A NODE-SEARCH PROGRAM IS RECORDED

BACKGROUND OF THE INVENTION

1. Field of the Invention

The present invention relates to a technique of searching for nodes in a network and more particularly to a node-search method, device and medium on which a node-search program is recorded for searching for nodes in a network configured with a plurality of domains which are connected through a mutual network connection device.

2. Description of Related Art

In a network, a plurality of addressable devices, which are called nodes, are connected. For example, work stations, personal computers, printers, scanners, router, etc. are used as a node. In this kind of network, it is difficult to always know all existing nodes. Therefore, it is sometimes necessary to search for the existence of a certain node. For example, searching for a node which performs a specific service.

For this purpose, it is possible to design a network in which a node which performs a specific service in the network returns its name and status in response to a broadcast from a specific port number. For example, by setting a host computer such that it broadcasts from the above-described specific port number when the power is turned ON or when starting to print, it is possible to search for a node which performs a specific service, such as a printer for printing.

On the other hand, there are networks configured with a plurality of sub networks connected by an interworking unit (IWU) for example a router. In such a network, the broadcast from a certain sub network cannot normally be transferred over the router. Therefore, with the method described above, it is not possible to search for service providing nodes in sections connected through the IWU.

For example, suppose a network in which a sub network A and a sub network B are mutually connected through a router is configured. The subnet mask for the sub networks A and B is 255.255.255.0, the address of the router for the sub network A is xxx.yyy.22.255, and the address of the router for the sub network B is xxx.yyy.33.255. In such a network configuration, the broadcast address from a node (host) connected to the sub network A to within the sub network A is xxx.yyy.22.255. However, the router does not transfer a broadcast packet containing this broadcast address to the sub network B.

Accordingly, depending on the broadcast described above from a node in the sub network A, there may exist a problem in that it is not possible to obtain a response from a node in the sub network B.

SUMMARY OF THE INVENTION

The object of the present invention is to provide a node-search method, device and medium on which a node-search program is recorded that make it possible to search for a node by using a broadcast packet even when the network is configured with a plurality of domains which are connected through an interworking unit.

In order to accomplish this object, a first mode of the present invention provides a node-search method in a network, comprising the steps of:

acquiring a packet which includes routing information for a domain in the network;

sending a broadcast packet, for requesting a response from a node which provides a specific service, to the domain which is listed in the acquired routing information; and receiving a response packet for the broadcast packet and detecting the node that sent the response packet.

A second mode of the present invention provides a node-search method in a network, comprising the steps of:

sending a packet, for requesting routing information from a network which is connected to an interworking unit, to the interworking unit, which is capable of storing routing information set in advance;

receiving a packet containing the routing information;

sending a broadcast packet to a domain which is listed in the received routing information for requesting a response from a node which provides a specific service; and receiving a response packet in response to the broadcast packet, and detecting the node which sent the response packet.

A third mode of the present invention provides a node-search method for searching for a node providing service in a network made up of a plurality of domains, comprising:

a first process for searching for all of the domains of the network, and a second process for searching for a node which provides a specific service in at least one of the domains detected in the first process.

A fourth mode of the present invention provides a node-search method in a network, comprising the steps of:

receiving a RIP (Routing Information Protocol) packet;

acquiring information indicating the network number and an address of a router of each domain in the network from the received RIP packet that indicates; and broadcasting, based on the acquired information, into a specific network so as to search for a node, using a specific port number.

A fifth mode of the present invention provides a node-search device for searching for a node in a network, comprising:

network interface means for connecting with the network;

means for acquiring domain information from a packet containing routing information which was acquired by the network interface means;

means for finding broadcast addresses for the domains;

means for generating a request packet to be sent to the found broadcast addresses for finding a response from a node which provides a specific service, and sending the packet to the network through the network interface means; and means for extracting information indicating nodes which perform a specific service contained in a response packet to the request packet so as to search the nodes.

A sixth mode of the present invention provides a node-search device for searching for a node in a network, comprising:

means for sending a packet, for requesting routing information for a network connected to an interworking unit, to the interworking unit, which is capable of storing preset routing information;

means for receiving a packet containing the routing information and acquiring information indicating a node contained in the routing information;

means for sending a request packet, which requests a response from a node which provides a specific service, to the interworking unit, the request packet broadcasted to domains connected through the interworking unit; and means for receiving a response packet for the request packet and detecting the node which sent the response packet.

A seventh mode of the present invention provides a computer-readable storage medium in which a program which is executed by a computer for searching for a node in a network is recorded, wherein:

the program makes the computer execute:

a process of acquiring a packet containing routing information in which a domain in the network is listed, which is sent to the network;

a process of sending a broadcast packet, for requesting a response from a node which provides a specific service, to the domain which is listed in the acquired routing information; and a process of receiving a response packet for the broadcast packet and detecting the node which sent the response packet.

An eighth mode of the present invention provides a computer-readable storage medium in which a program which is executed by a computer for searching for a node in a network is recorded, wherein:

the program makes the computer execute:

a process of sending a packet, for requesting routing information in a network which is connected to an interworking unit, to the interworking unit, which is capable of storing routing information set in advance;

a process of receiving a packet containing the routing information;

a process of sending a broadcast packet, for requesting a response from a node which provides a specific service, to a domain which is listed in the received routing information; and a process of receiving a packet in response to the broadcast packet, and detecting the node which sent the response packet.

A ninth mode of the present invention provides a computer-readable storage medium in which a program which is executed by the computer for searching for a node in a network is recorded, wherein:

The program makes the computer execute:

a first process for searching for all of the domains of the network, and a second process for searching for nodes which provide a specific service in at least one of the domains detected in the first process.

A tenth mode of the present invention provides a computer-readable storage medium in which a program which is executed by a computer for searching for a node in a network is recorded, wherein:

the program makes the computer execute:

a process of receiving a RIP (Routing Information Protocol) packet;

a process of acquiring information indicating a network number and an address of a router of each domain in the network from the received RIP packet; and a process of broadcasting, based on the acquired information, into a specific network so as to search for a node, using a specific port number.

An eleventh mode of the present invention provides a computer-readable storage medium in which a program which is executed by a computer for searching for a node in a network is recorded, wherein:

the program makes the computer execute:

a process of receiving an SNMP (Simple Network Management Protocol) packet;

a process of acquiring information indicating a network number and an address of a router of each domain in the network from the received SNMP packet;

a process of broadcasting into a specific network, based on the acquired information so as to search for a node, using a specific port number.

BRIEF DESCRIPTION OF THE DRAWINGS

FIG. 9 is a drawing explaining a configuration of a data structure of a domain list;

FIG. 10 is a drawing explaining a configuration of a data structure of a printer list;

DESCRIPTION OF THE PREFERRED EMBODIMENTS

The preferred embodiments of the present invention will be explained in reference to the drawings.

A first embodiment of the present invention will be explained. The node-search method of this embodiment acquires domain information of a network using RIP (Routing Information Protocol), and searches for nodes within the domains of which the information is acquired based on the information. In the following, a case where the present invention is applied to a network which uses a router as an interworking unit will be explained. However, the present invention is not limited to this case. For example, the present invention can also be applied to networks which are connected by other kind of interworking units or units which relay traffic between domains, such as a bridge, brouter or gateway.

The specifications for RIP are disclosed in RFC (Request for Comments)-1058. Also, the specifications for expanded RIP Ver. 2 (also called RIP2) are disclosed in RFC-1723. Furthermore, an explanation of conditions is given in RFC-1923. To distinguish RIP from RIP2, RIP disclosed in RFC-1058 is also called RIP Ver. 1 or RIP1.

Figure 1:
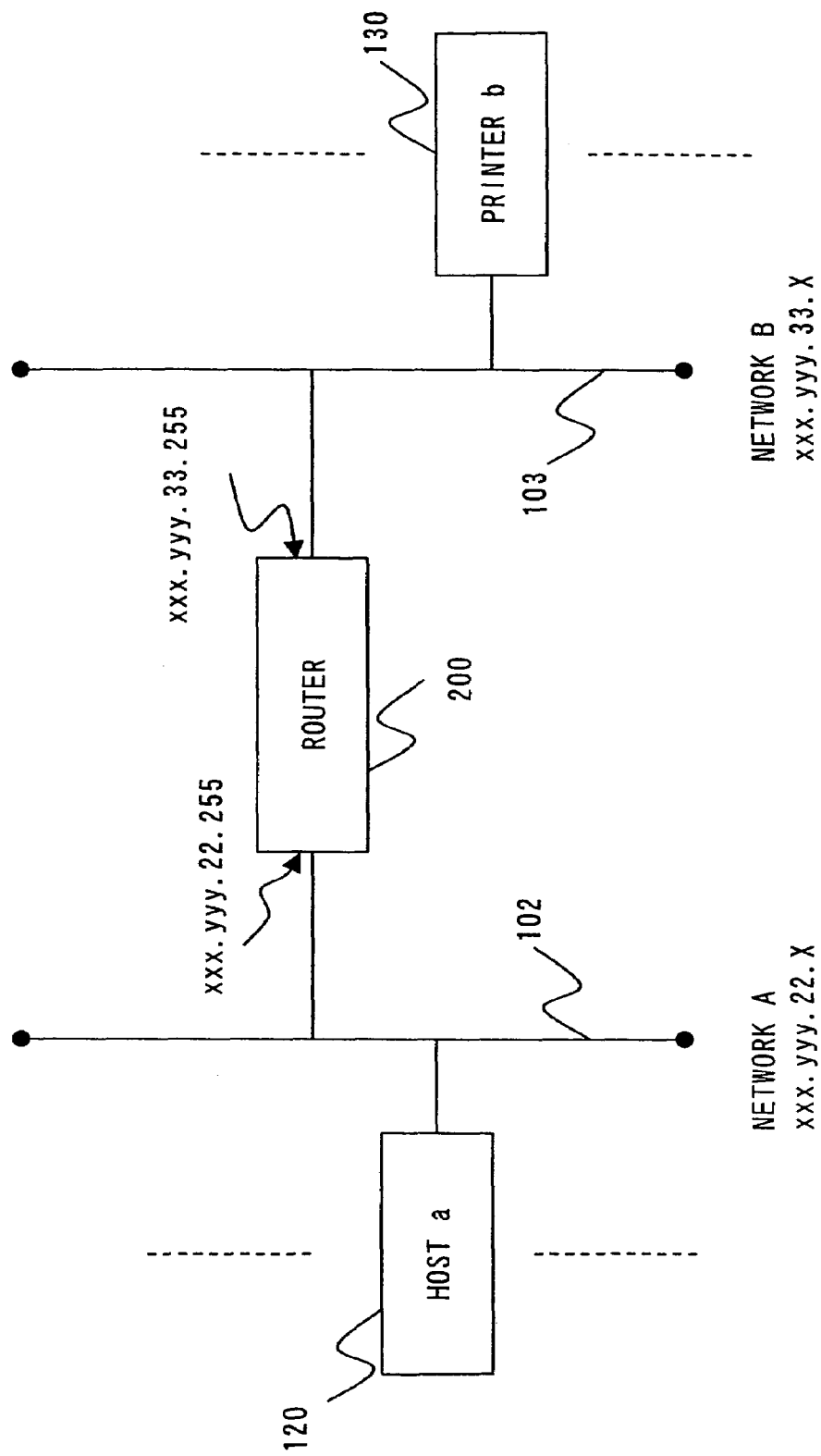
FIG. 1 is a drawing explaining a network which is configured with a plurality of networks connected mutually by a router.

A summary of the node-search method of this embodiment is explained using FIG. 1 as a reference. In FIG. 1, a network is constructed by connecting a sub-network A and a sub-network B with a router 200. Here, a subnet mask for the sub networks A and B is 255.255.255.0, an address of the router 200 for the sub network A is xxx.yyy.22.255 and an address of the router 200 for the sub network B is xxx.yyy.33.255.

When a host 'a' 120 knows the address of the router 200 and the network address for the sub network B, it is possible to send a broadcast packet for xxx.yyy.33.255 to the router 200. When the router 200 receives such a broadcast packet, it transfers the broadcast packet to the sub network B.

The transferred broadcast packet is received by each node in the sub network B. For example, the printer 'b' 130 in the sub network B returns a response packet to the router 200 in response to the received broadcast packet. The router 200 transfers the response packet to the host 'a' 120 which sent the original broadcast packet.

In this way, the host 'a' 120 is able to know the existence of the printer 'a' 130 in the sub network B connected through the router 200.

It is possible to obtain the network address and list of router addresses for the network by employing a protocol called RIP (Routing Information Protocol). Normally, this RIP is used for mutually exchanging routing information with the routers. The router broadcasts its own routing information at fixed time intervals, and responds to requests for routing information. As described above, by acquiring routing information from the router, it is possible to broadcast to networks connected through the router.

Moreover, since routing information is being mutually exchanged with the routers, it is possible to acquire routing information by acquiring the routing information which is sent to a network.

Embodiments of the present invention will be explained in reference to FIG. 2 to FIG. 14. In the embodiments explained below, the node-search program, the method for searching for nodes by executing the node-search program, and the device for searching for nodes by executing the node-search program are explained respectively in detail.

Figure 2:
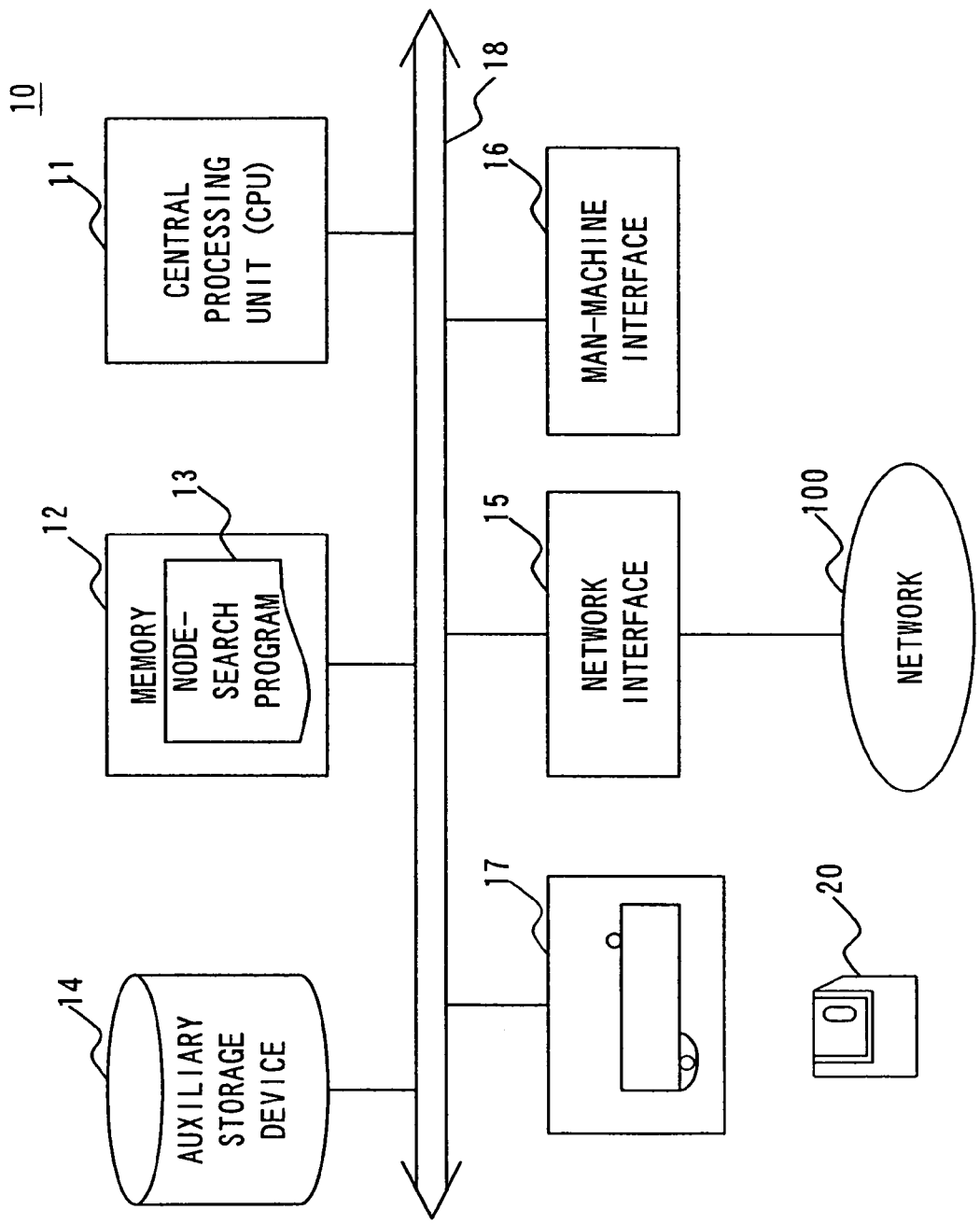
FIG. 2 is a block diagram showing a hardware system configuration of a device having a node searching function to which the present invention is applied.

First, FIG. 2 will be used to explain an example of a client device (Client PC) for searching for nodes as a host. In FIG. 2, the client PC 10 comprises: a CPU 11 for performing operations according to a program, a memory 12 for storing programs and work data, an auxiliary storage device 14 for storing the target processing data and processing result data, a network interface 15 for connecting to a network 100, a man-machine interface 16 for displaying information to the user and for receiving operation from the user, a medium reading device 17 for reading information stored on a storage medium 20, and a bus 18 for connecting all of these. The above described programs include the operating system (OS), various applications, the node-search program 13, which contains the node-search procedure described later, and the like.

Figure 3:
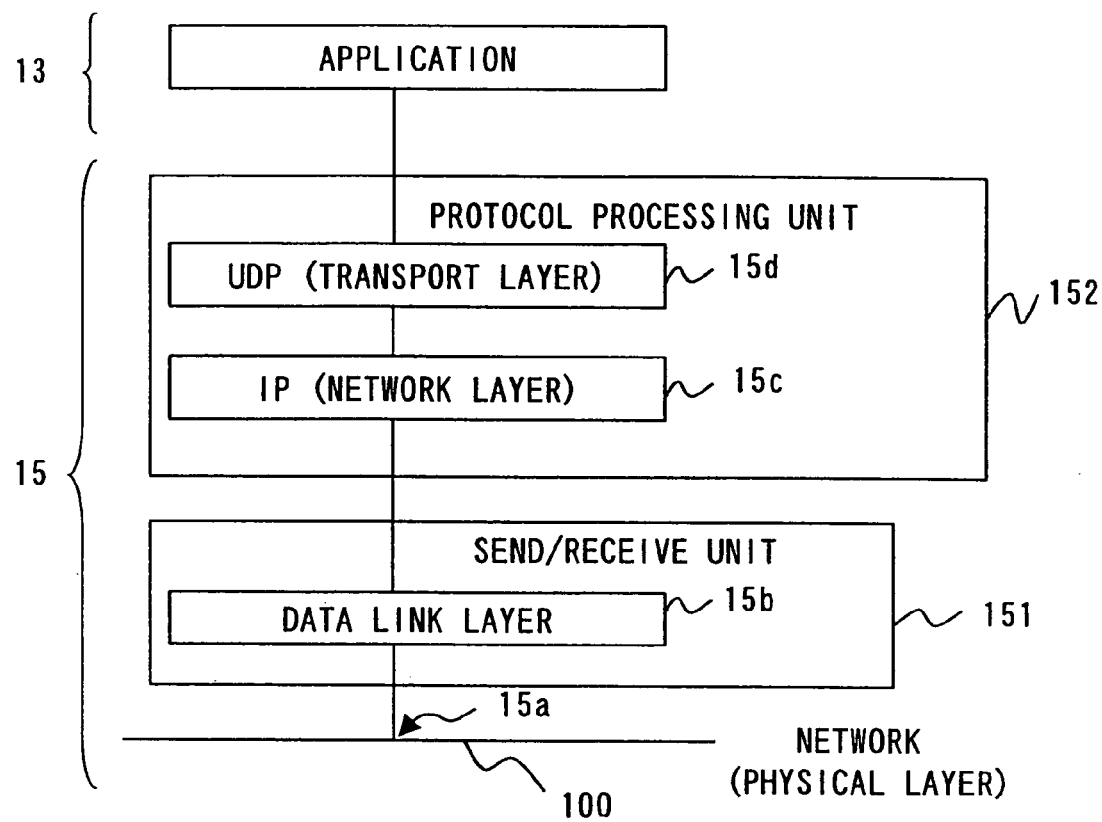
FIG. 3 is drawing explaining a hierarchical structure of a network interface function.

Next, the network interface will be described with reference to FIG. 3. The network interface 15 comprises: a connector 15a for physically connecting with the network 100; a send/receive unit 151 which constitutes a data link layer 15b; and a protocol processing unit 152 for realizing an IP protocol 15c and a UDP protocol 15d.

The man-machine interface 16 comprises at least one of a keyboard and a pointing device, and a display device. An I/O device, such as a touch panel, with an input and output function, may also be used.

The medium reading device 17 and storage medium 20 should be compatible with each other. For example, a magnetic floppy disk, optical disk, magneto-optical disk or magnetic tape may be used as the storage medium 20.

The node-search program 13 is loaded into the memory 12 and executed by the CPU 11. As a result, the node-search function is made possible. The program 13 which is loaded into the memory 12 may be provided in any way. In other words, the program 13 can be stored on and provided by a computer-readable storage medium. In addition, the program 13 may be provided by downloading it through a network. For example, the program which was stored beforehand in the auxiliary storage device 14 can be loaded into the memory 12. Also, the program which is stored on the storage medium 20 may be read by the medium reading device 17 and loaded into the memory 12.

Figure 11:
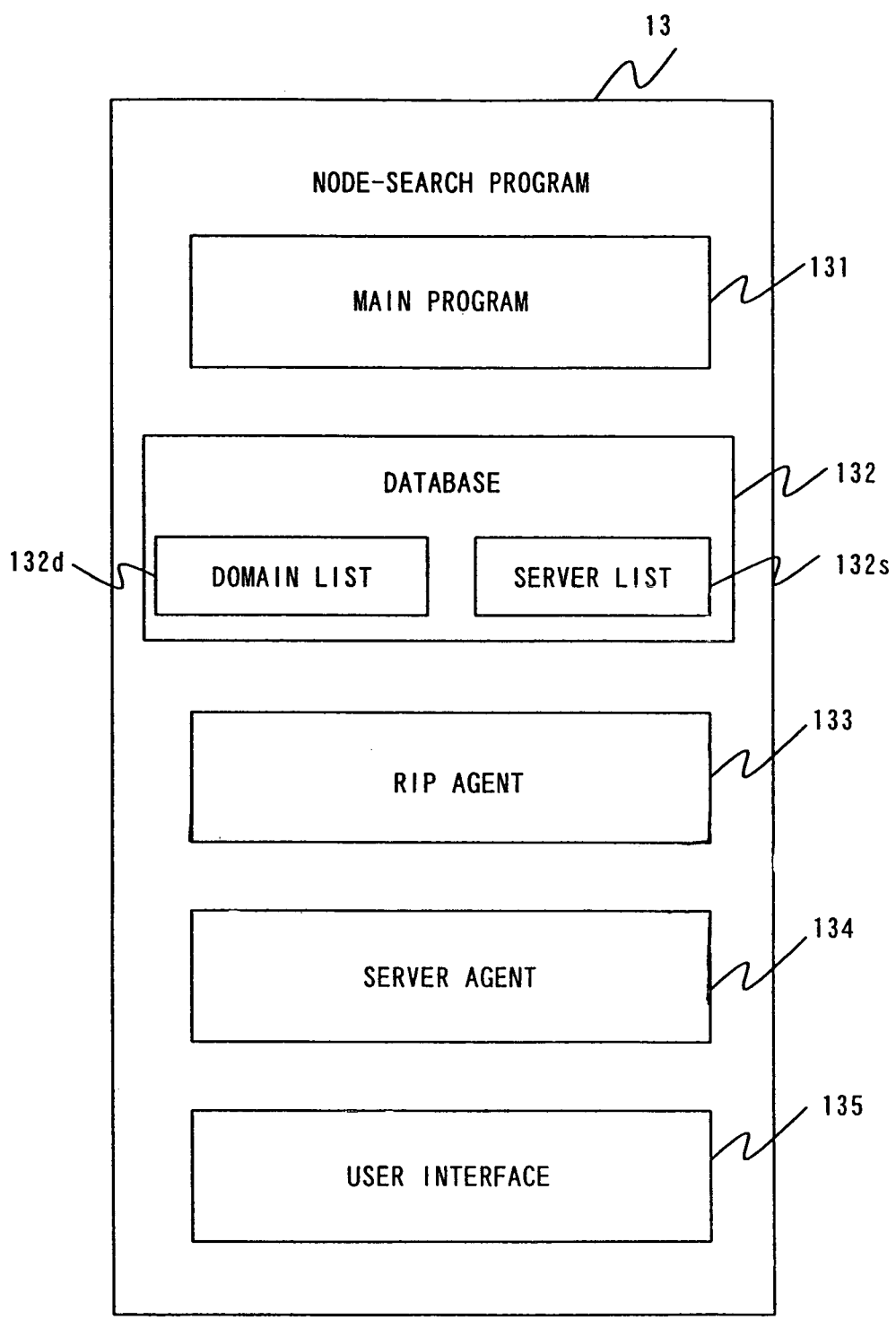
FIG. 11 is a block diagram showing a configuration of the node-search function in a first embodiment of the present invention.

Next, the configuration of function realized by the node-search program 13 will be explained. As shown in FIG. 11, the node-search program contains a program which realizes each of a main program 131, a database 132, a RIP agent 133, a server agent 134 and a user interface 135 as a function module. The main program 131 performs overall control of all of the functions. These programs are executed by the CPU 11 to realize the respective function. The execution results are stored in the memory 12 or auxiliary storage device 14.

The RIP agent 133 is a module for sending a RIP request packet and receiving a RIP response packet in accordance with RIP specifications. The RIP specifications are disclosed, as mentioned above, in RFC-1058, RFC-1723, for example. In addition, the RIP agent 133 creates a domain list 132d based on the received RIP response packet.

The server agent 134 sends a server-name request packet corresponding to a specific service to a server which provides the service, and receives a packet containing the server name. In addition, the server agent 134 creates a server list 132s based on the packet containing the received information for identifying the server. The specific service mentioned above can be printing, scanning, and the like. In more detail, it is possible to mount a server agent including at least one of a module (Printer Agent) for sending a printer name request packet to a specified node and receiving a printer name packet, and a module (Scanner Agent) for sending a scanner name request packet to a specified node and receiving a scanner name packet.

The database 132 separately saves the domain list 132d which is created by the RIP agent 133, and the server list 132s which is created by the server agent 134. The data of these lists are temporarily saved, for example, in the memory 12, and further, in the auxiliary storage device 14. The server list 132s may be a printer list which is created from the printer name packet received by the printer agent, or a scanner list which is created from the scanner name packet received by the scanner agent.

The user interface 135 is a module for displaying the domain list 132d and server list 132s to the user. Also, the user interface 135 performs the processing for receiving instructions for specifying, for example, the type (description of service) of server to search for, or the range (for example, hop count) of the network in which searches for the server are performed. The user interface 135 also controls the man-machine interface 16 (see FIG. 2).

Figure 12:
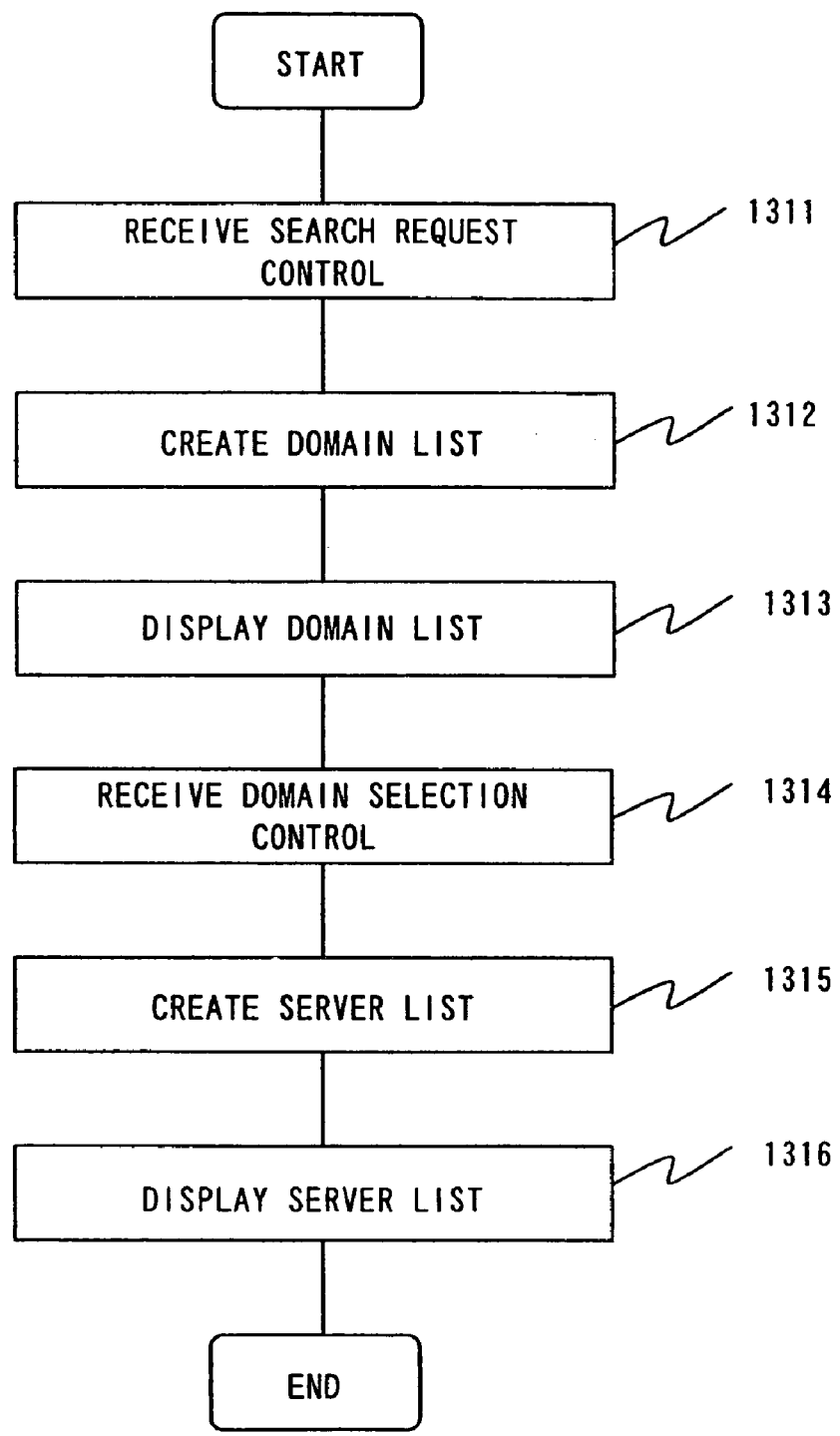
FIG. 12 is a flowchart showing an example of an operating procedure of a main program.

Next, the operating procedure of the main program is explained. FIG. 12 shows an example of the operating procedure of the main program 131. This procedure is executed by the CPU 11.

The node-search request control from the user through the man-machine interface 16 is received by the user interface 135 (step 1311). In other words, it receives a request to execute the node-search program 13. The CPU 11 takes this opportunity to activate the RIP agent 133 and have the RIP agent 133 create a domain list 132*d* (step 1312).

Next, the created domain list 132*d* is displayed on the man-machine interface 16 by the user interface 135 (step 1313). The user control through the man-machine interface 16 for selecting a specific domain from the displayed domain list 132*d* is received by the user interface 135 (step 1314).

The CPU 11 activates the server agent 134. In addition, it has the server agent 134 create a server list 132*s* (step 1315). The server agent 134 receives this instruction and broadcasts a packet to the selected domain for finding a server which corresponds to the specific service (for example a printer or a scanner). The server agent 134 finds the servers from the response packet in response to the packet for finding servers, and creates a server list 132*s* for the found servers.

The CPU 11 has the man-machine interface 16 display the created server list 132*s* by the user interface 135 (step 1316).

By creating a server list for each of the domain lists 132*d* which are searched for and created by the RIP agent 133, it is possible to list up all of the servers on the network. This makes it possible to search the entire network by sending a broadcast packet to each domain.

Figure 13:
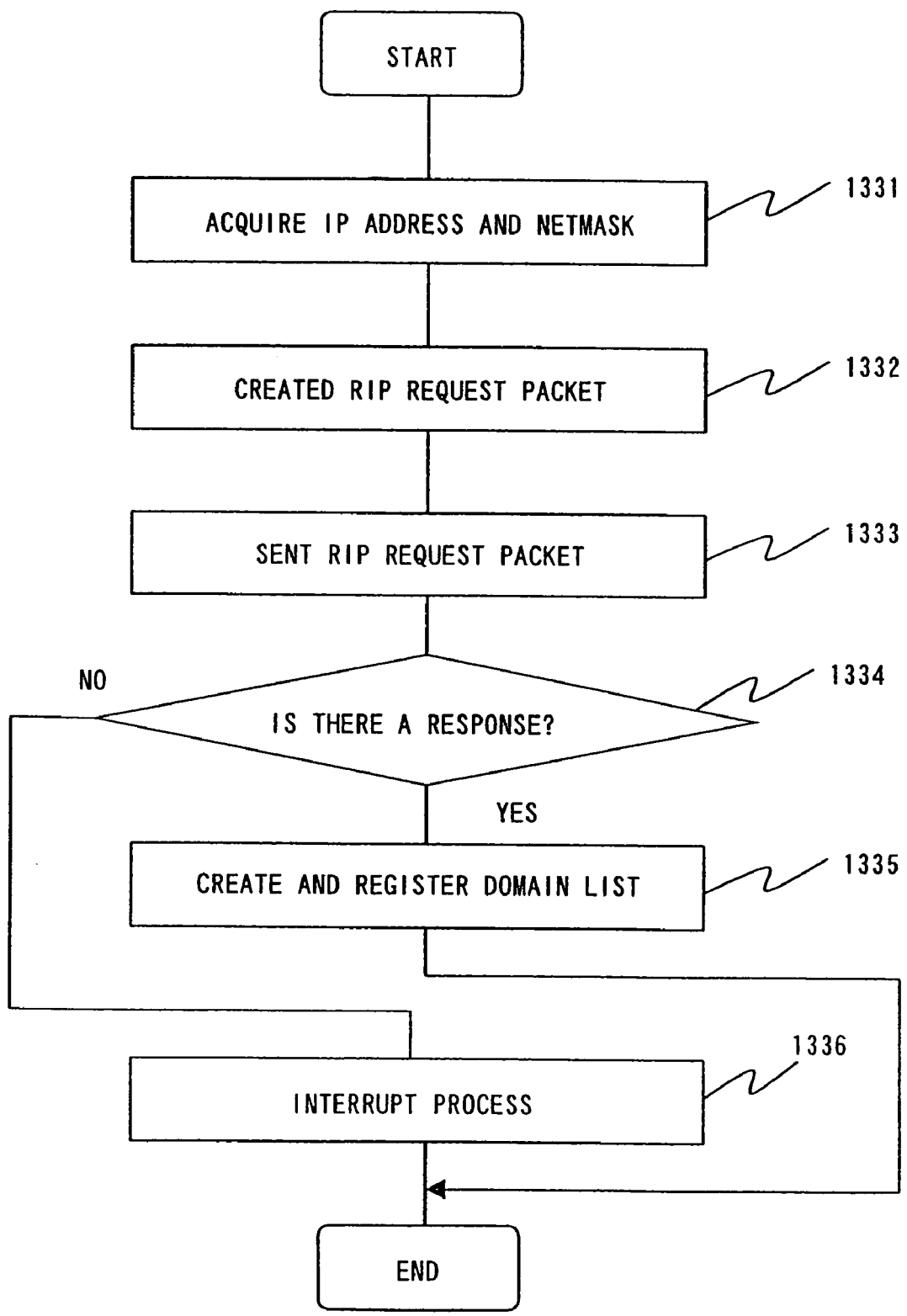
FIG. 13 is a flowchart showing an example of the procedure for creating a domain list by a RIP agent.

Next, FIG. 13 will be used to explain in detail the process for creating a domain list by the RIP agent 133. FIG. 13 shows the procedure for creating a domain list by the RIP agent 133.

After activated by the main program 131, the RIP agent 133 first acquires the IP address and subnet mask of a default router from the network settings of the operating system in the client device (client OS) (step 1331). For example, the information "Default Router: xxx.yyy.1.1, Subnet mask: 255.255.255.0" is acquired from the network settings.

Next, the RIP agent 133 creates a RIP request packet (step 1332). The RIP agent 133 then sends the created RIP request packet to the default router and waits for a response (steps 1333, 1334).

The RIP agent 133 creates a domain list 132*d* from the RIP response packet obtained as a response from the default router, and registers it in the database 132 (step 1335).

When a response is not obtained from the default router within a set time period in step 1334, the RIP agent 133 performs the interrupt process (step 1336). In other words, the RIP agent 133 notifies the user from the user interface 135 through the man-machine interface 16 that a trouble has occurred in the default router or gives a warning that the default router does not support RIP protocol. It then interrupts processing. Here, the set time period can be set to be 60 seconds for example. In the RFC, it is recommended that an RIP packet be broadcast every 30 seconds for transmitting routing information among routers. Therefore it is recommended that two times 30 seconds, or in other words, 60 seconds be set as the time for determining whether there is a trouble.

Figure 14:
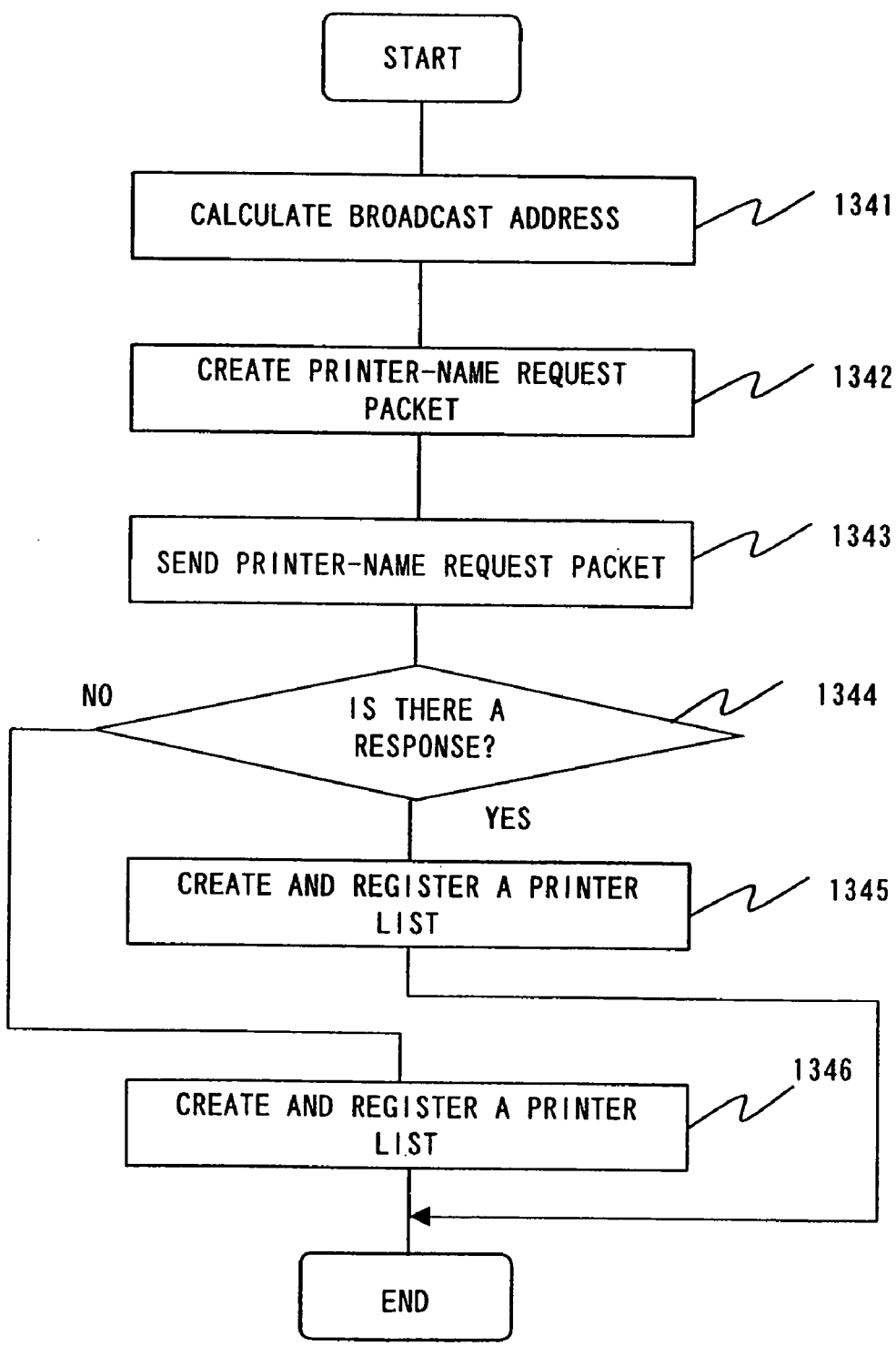
FIG. 14 is a flowchart showing an example of the procedure for creating a server list by a server agent.

Next, FIG. 14 is used to explain in detail the procedure for creating a server list 132*s* by the server agent 134. Here, a case of creating a list of the server which performs as a printer is explained. The invention is not limited to this case. For example, it is also possible to create a list of servers which perform a different service, using the same procedure.

After being activated by the main program 131, the server agent 134 calculates the broadcast address for the specified domain according to equation (1) below (step 1341).

$$BA = DA \text{ or (not } NM) \tag{1}$$

For example, when the domain address is DA=xxx.yyy.2.0, and the subnet mask is NM=255.255.255.0, then the broadcast address BA is found to be BA=xxx.yyy.2.255 from equation (1).

Next, the server agent 134 creates a printer name request packet (step 1342). The TCP/IP port number which is used when creating the packet is a specially assigned number. It is possible to specify the printer name request packet with a character string such as "GetPrintername" in the UDP data. Also, in addition to this, or instead of this, it is also possible to specify it using the TCP/IP port number in the UDP data.

The server agent 134 sends the printer name request to the calculated broadcast address and waits for a response (steps 1343, 1344). The server agent 134 collects the responses which were obtained within a set time period, and creates a printer list (step 1345). Also, when no responses are obtained from any printers within the set period of time, the server agent 134 creates an empty list showing that there are no printers in the domain (step 1346).

Here, an example of creating a list of print servers for printing is explained. This invention is not limited by this, and may also be applied to creating a list of servers for performing different kinds of services. For example, when creating a list of scanner servers for performing scanning, a scanner name request packet is created instead of the printer name request packet, and this request is broadcasted. It is possible to specify the scanner name request packet with a character string such as "GetScannername" in the UDP data.

Figure 4:
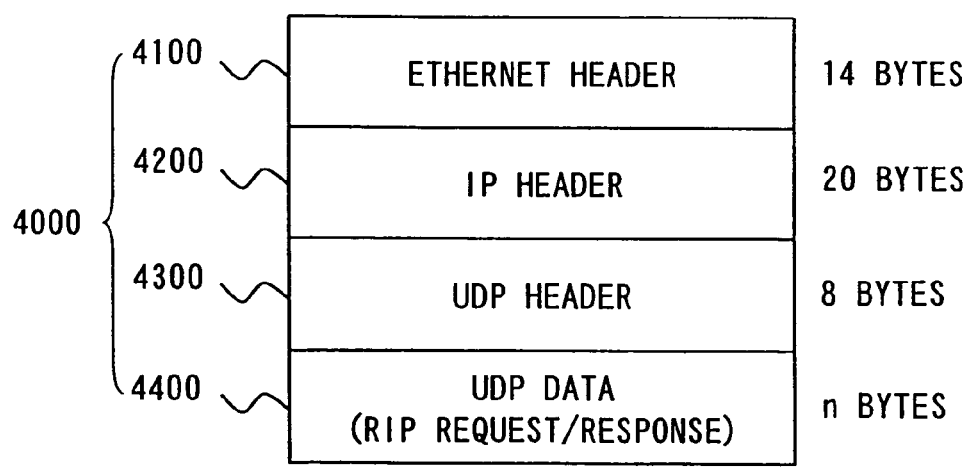
FIG. 4 is a drawing schematically explaining a configuration of a RIP request/response packet.
Figure 5:
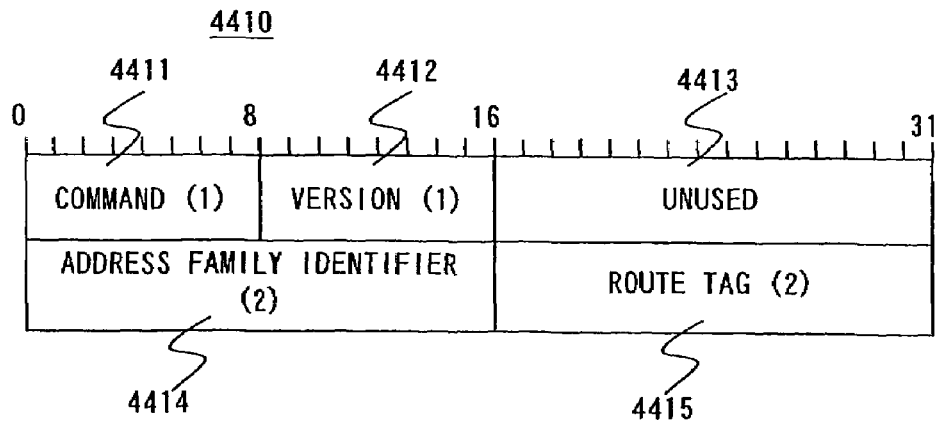
FIG. 5 is a drawing schematically explaining a configuration of a RIP request message.
Figure 6:
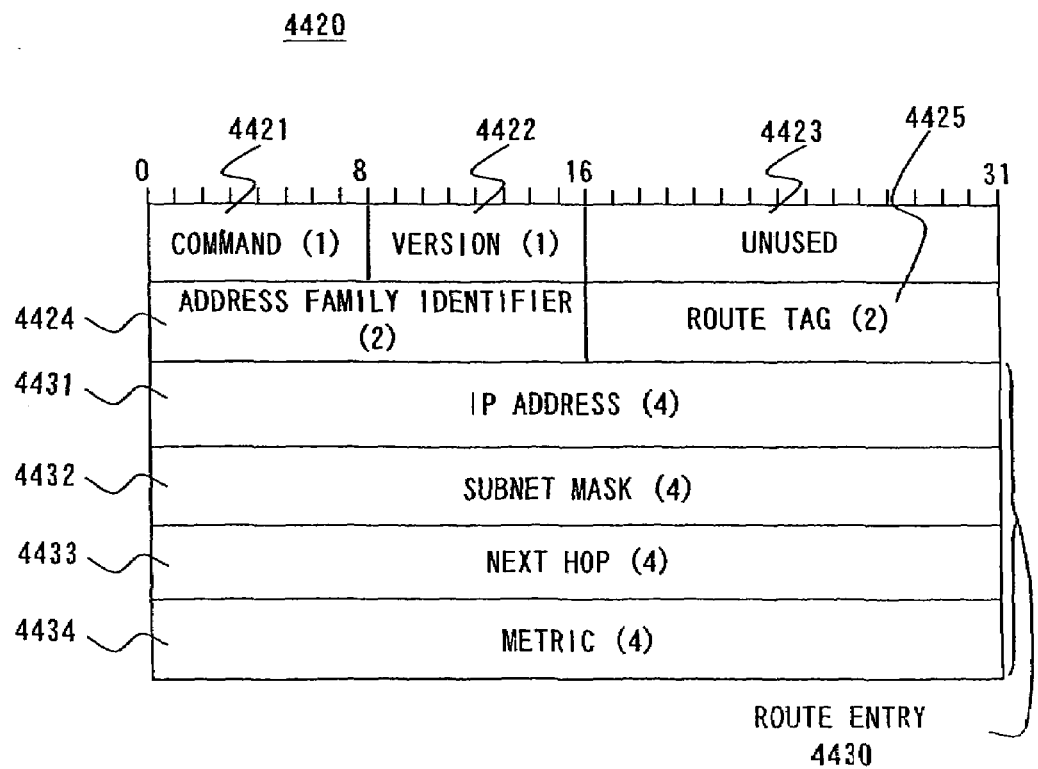
FIG. 6 is a drawing schematically explaining a configuration of a RIP response message.

Next, FIG. 4 to FIG. 6 are used to explain in detail the RIP packet. The RIP packet is included in and carried by the UDP datagram of the UDP (User Data Protocol), which is one protocol in a transport layer. UDP port 520 is used for both sending and receiving (see FIG. 3). However, it is also possible to send from an arbitrary UDP port of the request source. In this case, as well, the response is sent to the UDP port 520.

Here, when a device (for example, a UNIX workstation) which starts the program for transmitting routing information is connected to the network, a response to a broadcast is returned by the device, as well.

In FIG. 4, the RIP packet 4000 comprises an Ethernet header 4100, IP header 4200, UDP header 4300 and UDP data 4400 which includes the RIP request/response message. Each header has fixed-length format. The Ethernet header 4100 has 14 bytes, the IP header 4200 has 20 bytes, and the UDP header 4300 has 8 bytes. The UDP data 4400 including the RIP request/response message is variable length data which corresponds to the length.

The RIP request/response message comprises: a command for indicating whether the message type is a request or response, a version number for indicating the RIP version, a route tag, and a address family identifier. In a case of response type message, it also includes a route entry.

When requesting a routing table, "1" is set as the command. By broadcasting the packet which includes the command, it is possible to acquire packets which include a response message from all of the routers on the network. In this case, "2" is set as the command.

The routing table contains up to 25 entries in which 20-byte is repeated from the fifth byte. Entries over that are obtained by further performing a RIP request. For a large routing table, the RIP request is performed several times until the routing table is complete.

In a case of RIP Ver1 (version=1), the route tag, subnet mask, and next hop are all "0". In other words, it is not possible to acquire a subnet mask value for each domain.

The address family identifier is for specifying the expression format of the address, and in a case of IP (Internet Protocol), "2" is set. IP is the network-layer protocol in the internet protocol set.

In a case of a request type message, "1" is set for the command to indicate a request, "0" is set for the address family identifier, and "16" is set for metric, which is the maximum value in RIP1.

Next, FIG. 5 is used to explain in detail the RIP request message. In FIG. 5, the RIP request message 4410 is a total of 8 bytes and comprises: a command (1 byte) 4411, a version (1 byte) 4412, unused bytes (2 bytes) 4413, an address family identifier (2 bytes) 4414, and a route tag (2 bytes) 4415.

In the RIP request message 4410 corresponding to RIP1, the command 4411 is set to "1" to indicate a request, the version 4412 is set to "1" to indicate RIP1, the address family identifier 4414 is set to "2", and the route tag 3315 is set to "0" because it is not supported by RIP1.

Next, FIG. 6 is used to explain in detail the RIP response message. In FIG. 6, the RIP response message 4420 comprises: a command (1 byte) 4421, a version (1 byte) 4422, unused bytes (2 bytes) 4423, an address family identifier (2 bytes) 4424, a route tag (2 bytes) 4425, and a route entry 4430 indicating routing information. In this figure, a case of one route entry is given. The number of route entries is not limited to this. There are cases with two or more route entries.

Accordingly, the RIP response message varies in message length depending on the size of the table to be transmitted, in other words, the number of route entries.

In the RIP response message corresponding to RIP1, the command 4421 is set to "1" to indicate a response, the version 4422 is set to "1" to indicate RIP1, the address family identifier 4424 is set to "2", and the route tag 4415 is set to "0" because it is not supported by RIP1. In addition, one or more route entries 4430 where routable addresses are listed in which 16 bytes are taken as a group follows thereto.

Each route entry 4430 comprises: an IP address (4 bytes) 4431 for indicating the network address of the domain, a subnet mask (4 bytes) 4432 for indicating the subnet mask of the domain, a next hop (4 bytes) 4433 for indicating the IP address of the router which can be routed to the domain, and metric (4 bytes) 4434 for indicating the number of routers up to the point.

Next, the server name request packet which is broadcasted to a specified domain is explained. Here, a case where a print server is used as a server is explained. Of course, the present invention can also be applied to other kinds of servers.

Figure 7:
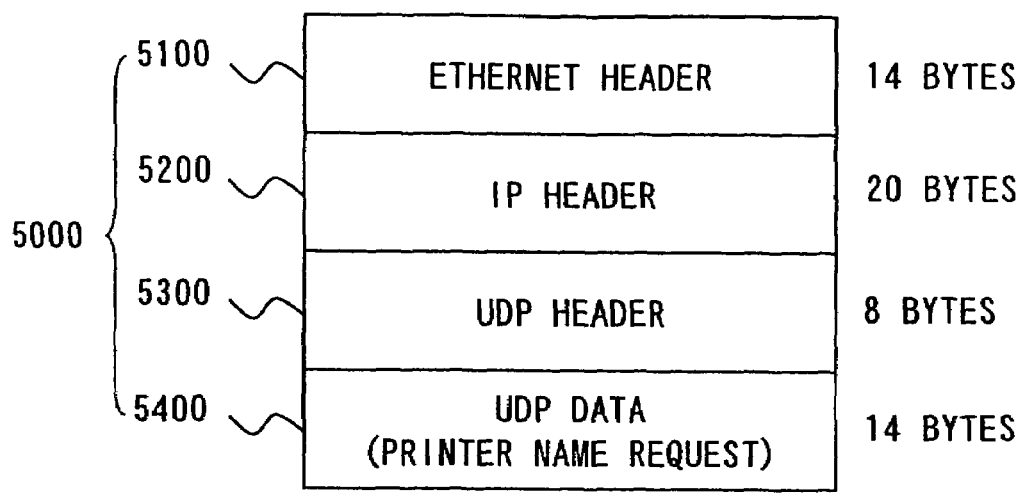
FIG. 7 is a drawing schematically explaining a configuration of a printer name request packet for requesting a printer name.

First, FIG. 7 is used to explain the printer name request packet. In FIG. 7, the printer name request packet 5000 comprises an Ethernet header 5100 (14 bytes), IP header 5200 (20 bytes), UDP header 5300 (8 bytes) and UDP data 5400 (14 bytes) which contains information indicating a printer name request.

It is possible to use a character string such as "GetPrintername" as the information indicating a printer name request. When the TCP/IP port number is used as the information indicating a printer name request, the port number should be specified as the destination port in the UDP header.

By broadcasting such a printer name request packet to a certain domain, the nodes in the domain to which it is broadcasted interpret the printer name request packet, and when a node provides the appropriate service (in this case printing), it returns a response packet.

Figure 8:
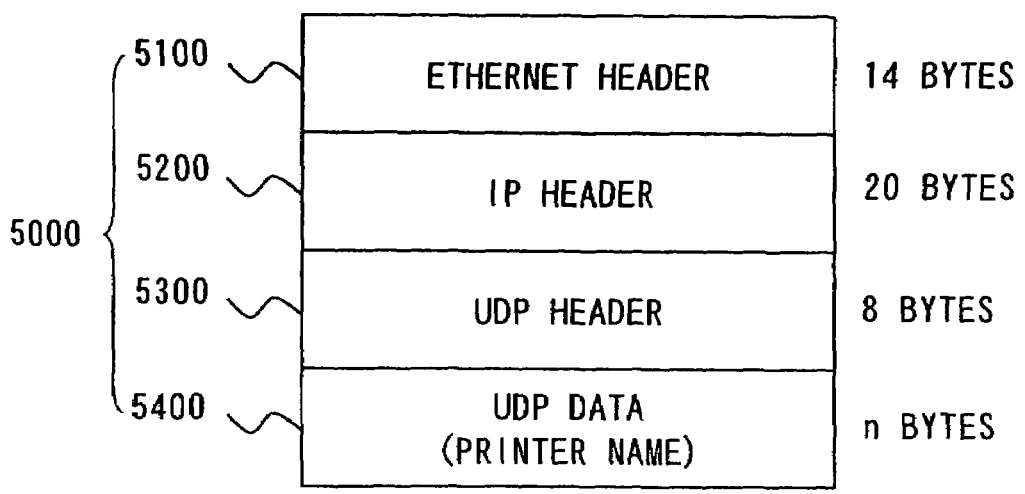
FIG. 8 is a drawing schematically explaining a configuration of a response packet for the RIP request packet.

Next, FIG. 8 is used to explain the response packet for the printer name request packet. In FIG. 8, the response packet comprises: an Ethernet header 5100 (14 bytes), an IP header 5200 (20 bytes), a UDP header 5300 (8 bytes), and UDP data 5400 which contains information indicating the printer name (variable length). The response packet is returned by unicast to the node that send the printer name request packet.

Next, FIG. 9 is used to explain the configuration of the domain list. In FIG. 9, the domain list 132d has relational structure in which information indicating a domain name 132d1, a destination router 132d2, and a subnet mask 132d3 are related to each other.

However, in the specification for RIP1, it is difficult to acquire the subnet mask. Therefore, the default subnet mask obtained at start up is set. This is because, when the subnet mask of its own domain is known, it is thought to be possible to use the same subnet mask for other domains as well.

When the subnet mask is different for each domain, it is thought that RIP2 is used. This is because, in a network where the subnet mask changes for each domain, the router for each domain must exchange subnet mask information together with routing information. Therefore, RIP2 is desired. When the present invention is applied to such a network, a RIP request packet corresponding to RIP2 is created and sent, and subnet mask information can be acquired together with the routing information. Then, by creating a broadcast packet, in which the broadcast address corresponding to the subnet mask value has been set, and sending it to all of the domains, it is possible to search for nodes in the entire network.

Since a human-readable name is not assigned to the domain name, the network address in the IP address is used.

Next, FIG. 10 is used to explain the configuration of a printer list, which is one kind of the server lists. In FIG. 10, a printer list 132p is divided according to domain with relational structure in which information indicating the printer name 132p2 and IP address 132p3 for each domain name 132p1 are related to each other.

In FIG. 10, the printer list shows that in domain xxx.yyy.1.0, there is a printer with the name 'diamond', and in domain xxx.yyy.2.0 there are two printers with the names 'emerald' and 'crystal', and no printers could be found in other domains.

The printer list has relational structure in which information indicating the domain name 132p1, printer name 132p2 and IP address 132p3 are related to each other. It is also possible to have a data structure changed in sequence for the domain names 132p1.

With this embodiment of the present invention, it is possible to search for nodes using a broadcast packet even for a network having a plurality of domains which are connected through an interworking unit (for example, a router) which selectively relays traffic between domains. Accordingly, by sending a single broadcast packet to every domain, it is possible to search for nodes in the entire network.

It is also possible to use the RIP protocol, which is currently installed in very many devices, as the protocol used in the search. This also has an advantage that the network, to which it is applied, covers a large range.

Furthermore, in the RIP protocol, the router periodically sends out routing information, so by acquiring and using this routing information, it is possible to create a domain list for passive operations only.

Next, a second embodiment of the present invention will be explained. In this embodiment, the hardware system is basically the same as that in the first embodiment, however the node-search method is different. In other words, in the node-search method of this embodiment, network domain information is acquired through a protocol called SNMP (Simple Network Management Protocol), and based on the information, nodes in the domains are searched for. The explanation of this embodiment will center around the procedure for acquiring network domain information through the SNMP protocol. Except for the procedure for acquiring domain information, the procedure is performed in the same way as the node-search method of the first embodiment of the invention described above. Any duplicate explanation is omitted here.

Figure 15:
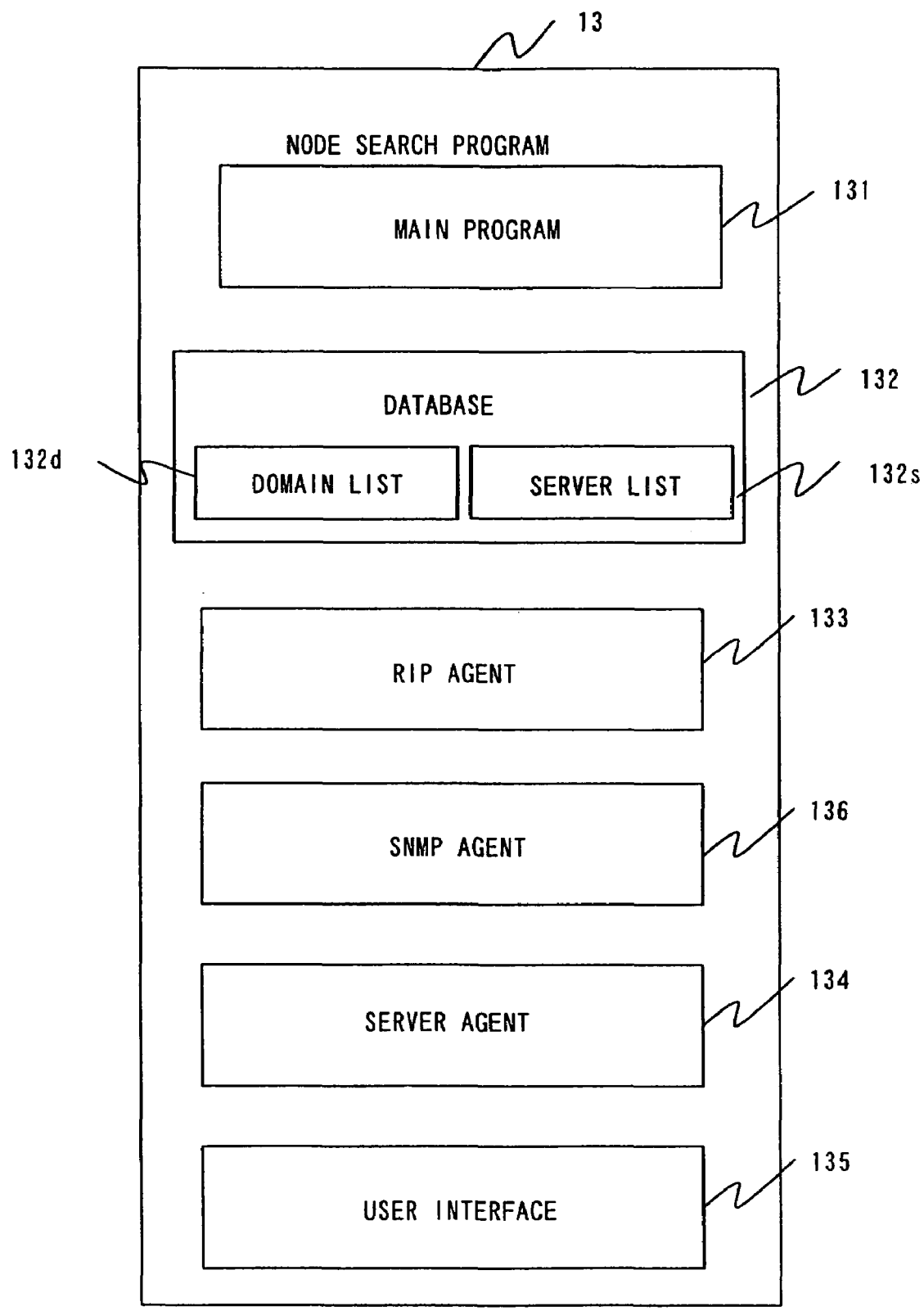
FIG. 15 is a block diagram showing a configuration of the node-search function in a second embodiment of the present invention.

This embodiment comprises a node-search program as shown in FIG. 15. As shown in FIG. 15, in this embodiment, the feature of an SNMP agent 136 has been added to the node-search program of the first embodiment described above.

When setting the router, the RIP may intentionally be turned OFF. For example, there is a case of using a static table which was created beforehand without performing automatic trading of routing tables between routers, or a case of using another routing table control protocol. When the RIP is turned OFF like this, it is not possible to execute the procedure for creating the domain list described for the first embodiment. Therefore, it is desired that the domain list be created by a different procedure. For example, it is possible to use SNMP.

SNMP is widely used as the protocol for controlling devices connected to a network and has been adopted by most routers. The specifications for SNMP are listed for example in RFC1155, RFC1157 and RFC1213.

The information corresponding to the RIP routing table is listed in the IP routing table (OID:=1.3.6.1.2.1.48.4.21) in the host source MIB on a database called MIB (Management Information Base) provided by SNMP. Here, the OID is the object identifier which indicates the object in the hierarchical command architecture in the MIB. It is a non-negative integer string and expresses individual paths passing through the hierarchical structure.

Figure 16:
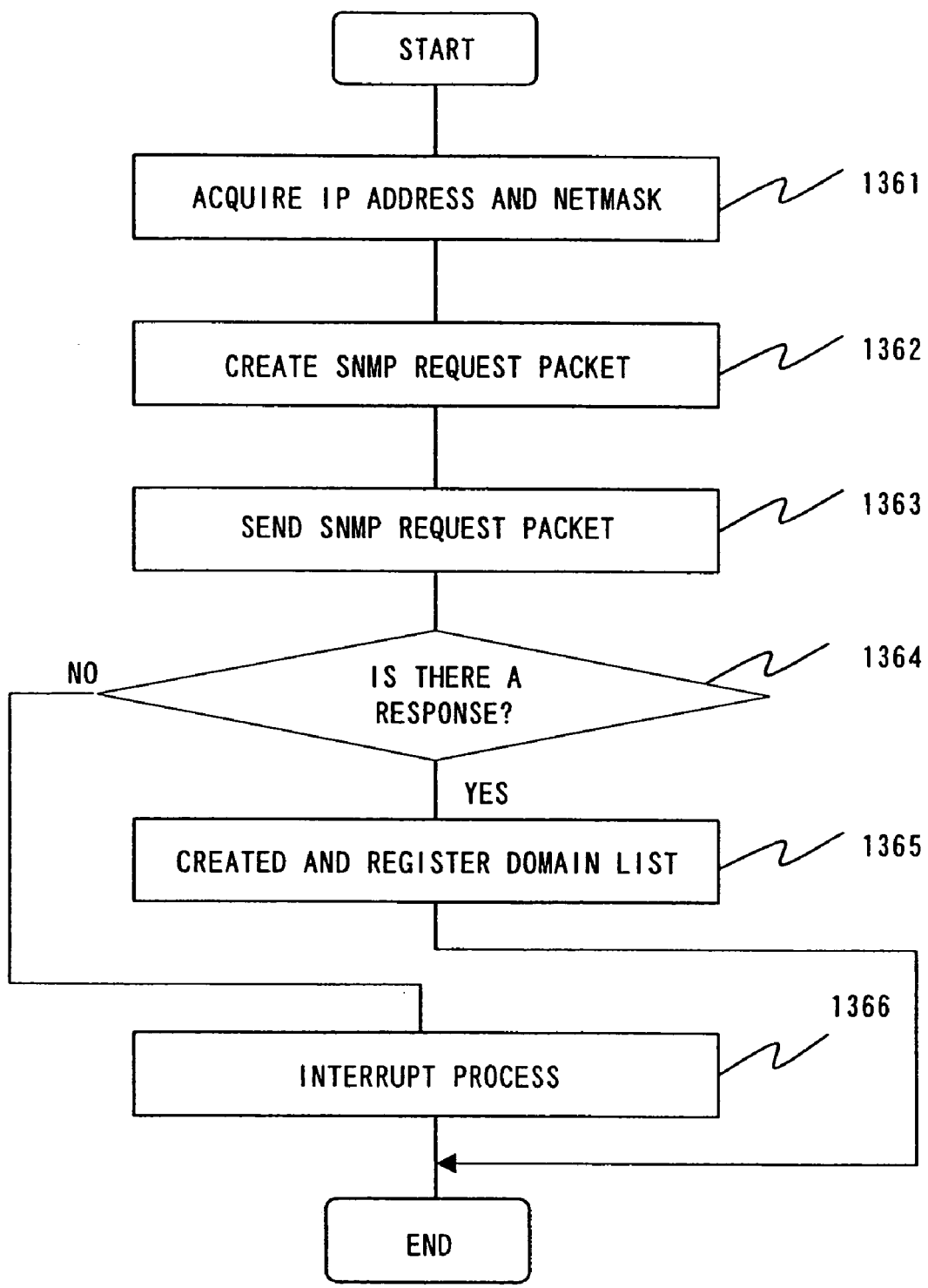
FIG. 16 is a flowchart showing an example of the procedure for creating a domain list by an SNMP agent.

It is possible to use SNMP to acquire the IP routing table, and to create domain list similar to the procedure described above. FIG. 16 is used to explain the procedure of using SNMP to create a domain list. FIG. 16 shows the procedure for creating a domain list using SNMP.

After being activated by the main program 131, the SNMP agent 136 acquires the IP address and subnet mask of the default router from the network settings in the client OS (step 1361). For example, the information "Default Router; xxx.yyy.1.1, Subnet mask: 255.255.255.0" is acquired from the network settings.

Next, the SNMP agent 136 creates an SNMP request (SNMP Get) packet which corresponds to the object identifier (OID:=1.3.6.1.2.1.48.4.21) which expresses the IP routing table (step 1362). In addition, the SNMP agent 136 sends the created SNMP request packet to the default router and waits for a response (step 1363, 1364).

The SNMP agent 136 creates a domain list from the SNMP response packet which is obtained as a response, and registers it in the database (step 1365).

When no response is obtained from the default router within a set time period in step 1364, the SNMP agent 136 performs the interrupt process (step 1366). In other words, the SNMP agent 136 notifies the user with the user interface 135 through the man-machine interface 16 that a trouble occurred in the default router, or gives a warning that SNMP is not supported by the default router. It then interrupts processing. Here, the set time period can be set to 60 seconds, for example, similar to the first embodiment of the present invention described above.

With this embodiment, it is possible to search for nodes using a broadcast packet even for a network having a plurality of domains connected through an interworking unit (for example, a router) which selectively relays traffic between domains. Accordingly, by sending a single broadcast packet to every domain, it is possible to search for nodes in the entire network. Also, as long as SNMP protocol is adopted, it is possible to perform a search even in a case where a network for which the RIP protocol is not adopted.

In the first and second embodiments described above, the procedure for searching for nodes in a domain other than one's own domain has been explained. The present invention, however, is not limited to this. For example, it is possible to apply the present invention to searching for nodes in one's own domain. In this case, a node name request broadcast packet can be sent to the nodes.

Moreover, in a case of a network having multiple levels of domains, or in other words, when there are domains connected to a node through two or more routers, it is still possible to acquire the domain name of each domain by using the RIP protocol or SNMP protocol. For example, searching is performed in the order of the closest domain, or in other words, starting from the domain with the fewest hop counts, and when at least one node which provides a specified service is found, it is possible to stop the search.

Also, it is possible to receive an instruction for specifying a network range to search, and to create a list of all the nodes which provide a specified service for each domain in the specified range. Specifying the network range can be done by the hop count, for example. In other words, a broadcast packet for requesting server names is sent to all domains whose hop count is less than the specified number, and by receiving a response packet for each of the broadcast packets, it is possible to search the domains in the range designated by the user and to list up all of the nodes which provide a specified service.

As described above, the embodiments of the present invention make it possible to search for nodes in the entire network by sending a broadcast packet to each domain.

With the present invention, it is possible to search for node using broadcasts packets even in a case of networks having a plurality of domains connected by an interworking unit which selectively relays traffic among domains.

What is claimed is:

1. A node-search method in a network, comprising the steps of:
   a host of a first domain, acquiring a packet which includes routing information of a network configured with a plurality of domains including the first domain connected to at least one interworking unit;
   the host, sending a broadcast packet, for requesting a response from a node which provides a specific service, to at least any one of said plurality of domains other than the first domain which is listed in said acquired routing information; and
   receiving a response packet for said broadcast packet and detecting the node which sent the response packet,
   wherein a plurality of interworking units exist in the network, wherein at least one of said plurality of interworking units is a bridge, a brouter, or a router, and first sending the broadcast packet to at least one of said plurality of domains with the fewest hop counts.

* * * * *